United States Patent
Jreij et al.

(10) Patent No.: US 6,292,548 B1
(45) Date of Patent: *Sep. 18, 2001

(54) METHOD AND APPARATUS FOR SELECTING DATA FROM MULTIPLE SOURCES FOR A TELEPHONE DISPLAY

(75) Inventors: Elie Antoun Jreij, Pflugerville; Vedat M. Bilgutay, Round Rock; Bruce E. Burnett, Austin, all of TX (US); Graham Howard, Boca Raton, FL (US); Heinz-Josef Fredericks, Puchheim (DE); Paul-Gerhard Joerg, Munich (DE); Gert Molewski, Neuried (DE)

(73) Assignees: Siemens Aktiengesellschaft, Munich (DE); Siemens Information & Communication Networks Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/620,049
(22) Filed: Mar. 20, 1996
(51) Int. Cl.$^7$ .................................................. H04M 11/00
(52) U.S. Cl. ...................................... 379/93.17; 379/93.23
(58) Field of Search .................................. 379/96, 93, 97, 379/98, 142, 93.17, 93.19, 93.23, 93.24, 93.25, 93.14

(56) References Cited

U.S. PATENT DOCUMENTS

| | | | |
|---|---|---|---|
| 5,570,420 | * 10/1996 | Bress et al. | 379/220 |
| 5,615,257 | * 3/1997 | Pezzullo et al. | 379/93.17 |
| 5,657,378 | * 8/1997 | Haddock et al. | 379/93.23 |
| 5,771,279 | * 6/1998 | Cheston, III et al. | 379/93.17 |
| 5,774,540 | * 6/1998 | Davidson et al. | 379/93.17 |

* cited by examiner

Primary Examiner—Stella Woo (57) ABSTRACT

An interface unit for a telephone receives data from an external source, such as an ISDN switch. Some of the data from the external source can be displayed on a display of the telephone. The interface unit also receives user inputs from various keys on the telephone, including a set of dialog keys. The interface unit includes a user interface that generates menu messages for displaying and operating a set of menus on the telephone display. A user of the telephone can use the dialog keys to navigate through the menus and perform a variety of actions, including executing telephone functions and changing the configuration of the telephone. A display data selector within the interface unit receives the data from the external source and from the interface unit and selects particular data items to be displayed on the telephone display. The selection of data to be displayed is based in part on the operational state of the telephone. The telephone has an active state, a configuration state and an idle state.

14 Claims, 8 Drawing Sheets

METHOD AND APPARATUS FOR SELECTING DATA FROM MULTIPLE SOURCES FOR A TELEPHONE DISPLAY

TECHNICAL FIELD OF THE INVENTION

The present invention relates to a telephone interface unit that receives user inputs and display data, and selects data from multiple sources for display on a telephone display.

BACKGROUND OF THE INVENTION

Some recent telephones have been provided with a liquid crystal display (LCD) for displaying information that may be usefull to the user of the telephone. For example, a digital telephone may be connected to a private branch exchange (PBX). Various digital data is communicated between the telephone and the PBX to enable the telephone and the PBX to perform their respective functions. For example, when a user at the telephone places a call, the telephone communicates the dialed telephone number to the PBX, so that the PBX can attempt to make a telephony connection with the dialed number. The telephone may be provided with a display unit to display some of the information that is received from the PBX. For example, the telephone may receive data from the PBX indicating the telephone number from which an incoming call originated, and the display unit may display this information for the benefit of the user of the telephone.

SUMMARY OF THE INVENTION

The present invention relates to an interface unit for a telephone display. In the preferred embodiment, the interface unit receives data from an external source, such as an ISDN switch. Some of the data from the external source can be displayed on the telephone display. The interface unit includes a user interface that receives user inputs from various keys on the telephone, including a set of dialog keys. The user interface generates menu messages for displaying and operating a set of menus on the telephone display. A user of the telephone can use the dialog keys to navigate through the menus and perform a variety of actions, including executing telephone functions and changing the configuration of the telephone. A display data selector within the interface unit receives the data from the external source and from the interface unit and selects particular data items to be displayed on the telephone display. The selection of data to be displayed is based in part on the operational state of the telephone. The telephone has an active state, a configuration state and an idle state.

Another embodiment of the present invention is an interface unit for a telephone display. The interface unit, which comprises a user interface and a display data selector, receives display data from an external source. The user interface detects user inputs and generates menu data for implementing a menu driven interface. The display data selector receives the display data from the external source and the menu data from the user interface and selects data items from the display data and the menu data for display on the telephone display.

DETAILED DESCRIPTION

Figure 1:
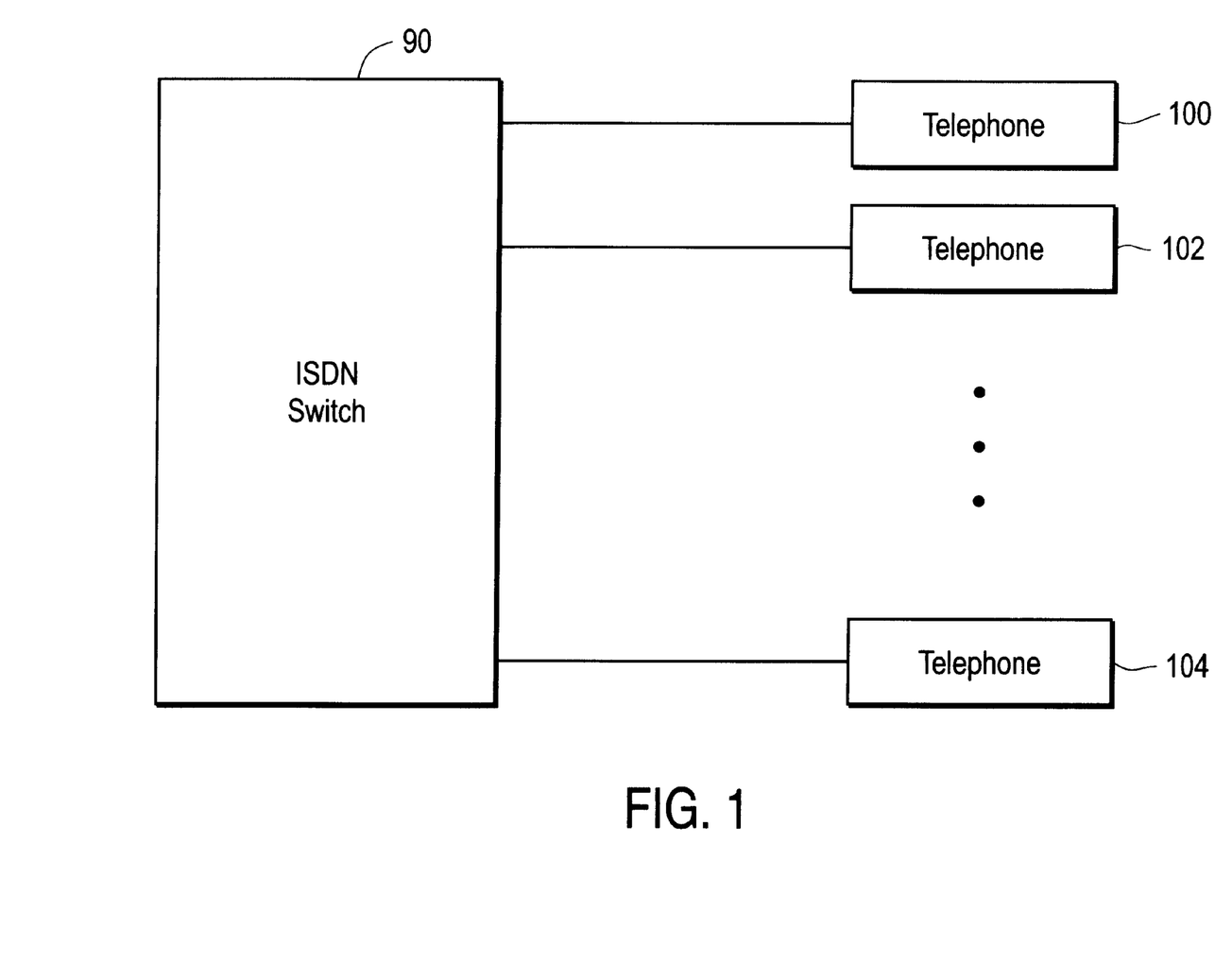
FIG. 1 is a functional block diagram of an integrated services digital network (ISDN) public telephone system.

FIG. 1 is a functional block diagram of an ISDN switching network. Although the preferred embodiment of the present invention is described in connection with an ISDN network, the invention may also be implemented in various other telecommunication systems. The ISDN network of FIG. 1 comprises an ISDN switch 90 and a plurality of digital telephones 100, 102 and 104. Each of the digital telephones 100, 102 and 104 sends data to the ISDN switch 90, and the ISDN switch 90 sends data to each of the digital telephones 100, 102 and 104. The ISDN switch 90 operates in a conventional manner, and the interfaces between the ISDN switch 90 and the telephones 100, 102 and 104 operate in a conventional manner.

Figure 2:
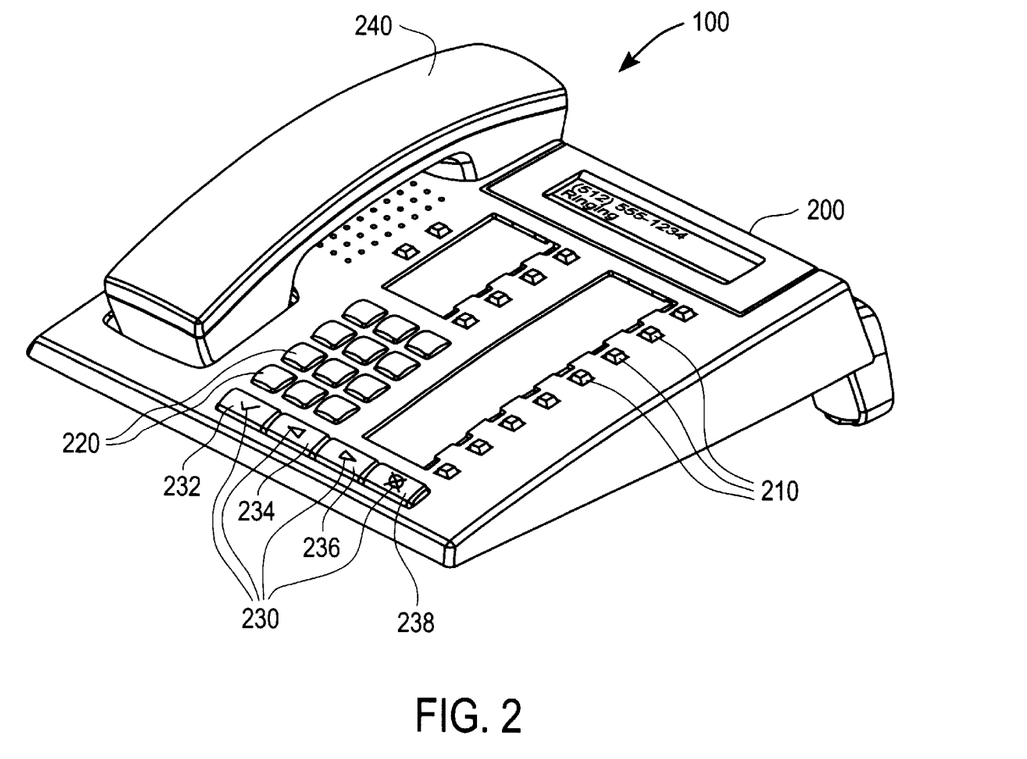
FIG. 2 illustrates a telephone of FIG. 1, implementing the preferred embodiment interface unit of the present invention.

FIG. 2 illustrates the digital telephone 100 of FIG. 1. Again, although the preferred embodiment of the present invention is described in connection with a particular model of digital telephone, the invention may also be implemented in various other models or types of telephones. The telephone 100 comprises an LCD display 200, a set of line/feature keys 210, a set of dialpad keys 220, a set of dialog keys 230 and a handset 240. In the preferred embodiment of the present invention, the dialog keys 230 comprise a select key 232, a left scroll key 234, a right scroll key 236 and a stop key 238. The line/feature keys 210, the dialpad keys 220 and the handset 240 may generally be of conventional design and operation.

Figure 3:
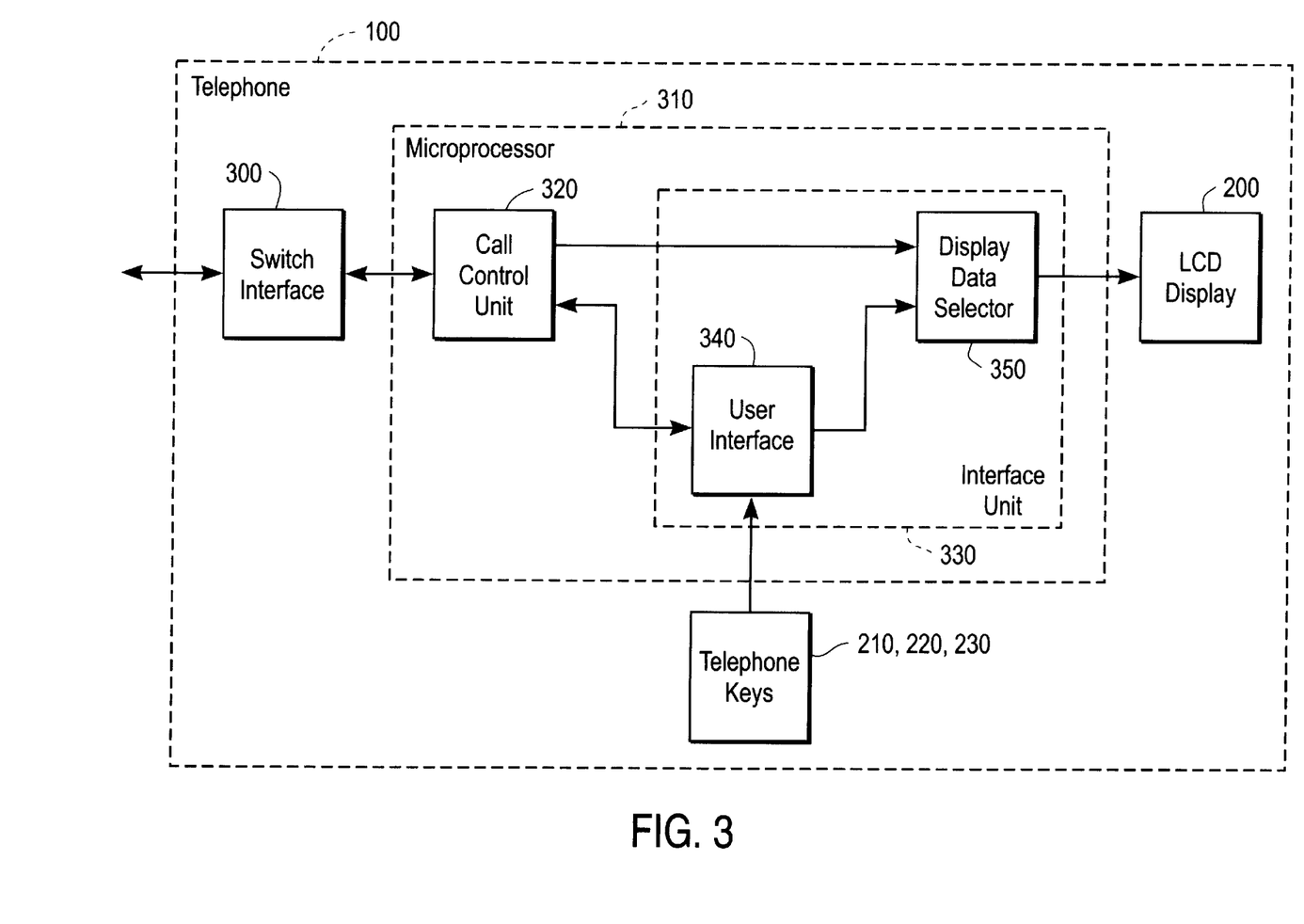
FIG. 3 is a partial functional block diagram of the telephone of FIG. 2, illustrating the functions of the preferred embodiment interface unit of the present invention.

FIG. 3 is a partial functional block diagram of the telephone 100. The telephone 100 comprises a switch interface 300, a call control unit 320, an interface unit 330, the LCD display 200 and a set of telephone keys. The interface unit 330 comprises a user interface 340 and a display data selector 350. In the preferred embodiment of the present invention, the call control unit 320, the user interface 340 and the display data selector 350 are implemented within a single programmed microprocessor 310. The set of telephone keys comprise the line/feature keys 210, the dialpad keys 220 and the dialog keys 230. The LCD display 200 may be of conventional design and operation. The present invention can also be implemented in connection with other types of display. The switch interface 300 may also be of conventional design and operation. The switch interface 300 receives data from the ISDN switch 90 and provides the received data to the microprocessor 310. The switch interface 300 also transfers data from the microprocessor 310 to the ISDN switch 90.

Figure 4A:
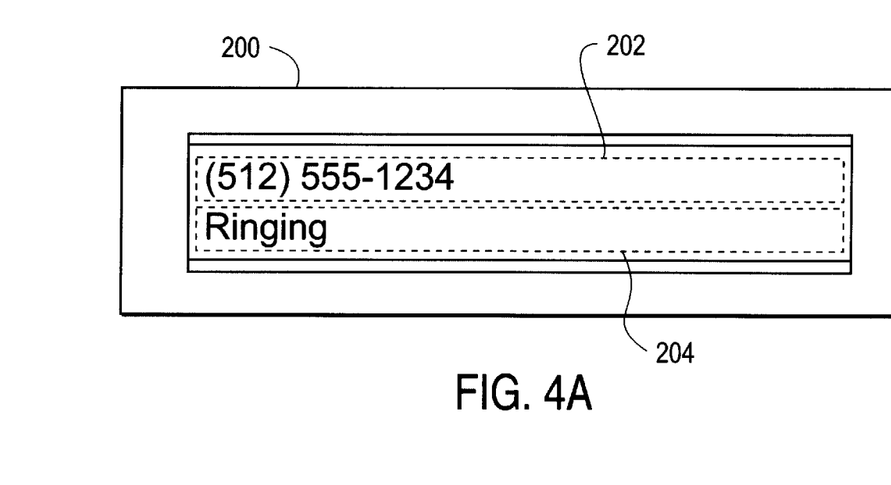
FIGS. 4A and 4B illustrate an LCD display of FIG. 2 in greater detail.
Figure 4B:
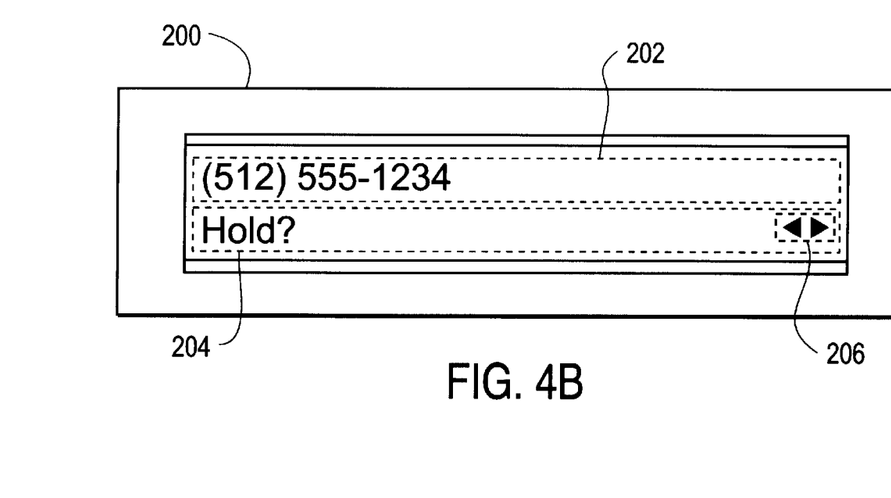

FIGS. 4A and 4B illustrate the LCD display 200 in greater detail. In the preferred embodiment of the present invention, the LCD display 200 comprises a 2 line by 24 character LCD display. Thus, as shown in FIGS. 4A and 4B, the LCD display 200 comprises a first line 202 and a second line 204.

As illustrated in FIG. 4B, the LCD display 200 may also comprise a set of dialog key symbols 206.

Referring again to FIG. 1, a person of skill in the art will readily understand the general operation of the ISDN switch 90 and the telephones 100, 102 and 104. In general, the ISDN switch 90 connects outgoing telephone calls from the telephones 100, 102 and 104 to the appropriate destinations, and the ISDN switch 90 connects incoming telephone calls from the source to the appropriate telephone 100, 102 or 104. The ISDN switch 90 sends various data to the telephones 100, 102 and 104, and the telephones 100, 102 and 104 send various data to the ISDN switch 90. For example, when an outgoing telephone call is placed from the telephone 100, the telephone 100 may first send a SETUP message to the ISDN switch 90, and the ISDN switch 90 responds with a SETUP ACK message to the telephone 100. As is well known to a person of skill in the art, various other data is communicated between the ISDN switch 90 and the telephone 100 to execute telephone calls and other functions.

Referring again to FIG. 2, the telephone 100 displays some of the information that is received from the switch 90 onto the LCD display 200 for the benefit of the user of the telephone 100. For example, suppose that the user of the telephone 100 initiates an outgoing telephone call by picking up the handset 240 and dialing the telephone number (512) 555-1234. As described in greater detail below, the telephone 100 displays the dialed telephone number on the first line 202 of the LCD display 200, as illustrated in FIGS. 2, 4A and 4B. When the telephone corresponding to the dialed number begins ringing, the switch 90 sends a message to the telephone 100 indicating this status, and the telephone 100 displays a message on the second line 204 of the display 200 to indicate that the telephone at the dialed number is ringing, as illustrated in FIGS. 2 and 4A. If the telephone corresponding to the dialed number is answered, the switch sends a message to the telephone 100 and the telephone 100 displays a message on the second line 204 indicating that the call has been connected. During other events in the telephone call, the switch 90 sends other messages to the telephone 100, and the telephone 100 displays selected information on the lines 202 and 204 of the display 200.

Referring again to FIG. 3, the user of the telephone 100 activates the telephone keys 210, 220 and 230 to control the operation of the telephone 100. For example, the user activates the dialpad keys 220 to dial a telephone number for an outgoing telephone call. The user interface 340 detects the activation of the telephone keys 210, 220 and 230 and reports selected key activations to the call control unit 320. The call control unit 320 controls much of the operation of the telephone 100. The telephone 100 preferably has at least three states of operation, an active state, a configuration state and an idle state. When the telephone 100 is placing, receiving, or otherwise facilitating a telephone call, the telephone 100 is in the active state. The user of the telephone 100 can also place the telephone 100 into the configuration state, in which the user can change various aspects of the operation of the telephone 100. For example, the user can program the telephone 100 to automatically dial a specific telephone number when a specific line/feature key 210 is pressed. In addition to the active, configuration and idle states, the telephone 100 may have various other states or modes of operation, such as a call log access state or a composed dialing mode of operation. However, these other states or modes of operation are not necessary for an understanding of the present invention. Thus, the present description assumes only three states of operation. With only three states of operation, the telephone 100 is in the idle state whenever the telephone 100 is not in either the active state or the configuration state.

The call control unit 320 communicates with the switch 90 through the switch interface 300. When the user dials a telephone number for an outgoing telephone call, for example, the call control unit 320 relays the dialed telephone number to the switch interface 300, which relays the digits to the switch 90. The switch interface 300 also receives data from the switch 90. All of the data received from the switch 90 is relayed to the call control unit 320, and the call control unit 320 utilizes some of the received data to control the operation of the telephone 100. For example, if, during a telephone call, the switch 90 sends a message to the telephone 100 indicating that the remote telephone has been hung up, the switch interface 300 relays the information to the call control unit 320, and the call control unit 320 terminates the telephone call at the telephone 100. The call control unit 320 also relays some of the information received from the switch interface 300 to the display data selector 350. As described in greater detail below, the display data selector 350 selects some of the data received from the switch 90, and displays the information on the LCD display 200.

As described above, the user interface 340 detects the activation of the telephone keys 210, 220 and 230 by the user of the telephone 100. In addition, the user interface 340 generates messages to the display data selector 350 for display on the LCD-display 200. In the preferred embodiment of the present invention, some of the messages generated by the user interface 340 implement a menu driven interface. The menu driven interface utilizes the second line 204 of the LCD display 200 and the dialog keys 230.

In the preferred embodiment, the telephone 200 provides numerous functions to the user, such as call conferencing, call transfer, and so on. The relatively large number of features available to the user makes the telephone 200 more complicated to use. For some features, the user must remember relatively complex sequences of actions to successfully execute the desired feature. The menu driven interface substantially simplifies the process of executing telephone functions.

In the preferred embodiment, the user interface 340 sends a message to the display data selector 350 to display a menu prompt on second line 204 of the LCD display 200, such as "Transfer?". At this point, the user of the telephone 200 may elect to transfer a telephone call by pressing the select key 232, or the user may elect to scroll to a different option in the menu. The menu driven interface provides to the user what appears to be a horizontal menu with just one option being displayed at a time. The user can press the right scroll key 236 to view a subsequent option in the menu, or the user can press the left scroll key 234 to view a previous option in the menu. When the user scrolls through the menu, the user interface 340 sends additional messages to the display data selector 350 to update the second line 204 with a prompt representing the appropriate option from the menu. When the user presses the select key 232, the user interface 340 communicates to the call control unit 320 to cause the displayed option to be activated. Selecting an option through the menu driven interface generally has the same effect as if the operator had selected the option using the line/feature keys 210. However, the menu driven interface enables the user to select from a larger number of features than is possible from the limited number of line/feature keys available on most telephones.

As can be seen from the above description, both the switch interface 300 and the user interface 340 send data to the display data selector 350 for display on the LCD display 200. In the preferred embodiment, the switch interface 300 sends data to be displayed on both lines 202 and 204 of the LCD display 200. However, the data that is to be displayed on the first line 202 is generally more important than the data to be displayed on the second line 204. The user interface 340 may also send data to be displayed on both line 202 and 204, but the more important data, namely the menu data, is to be displayed on the second line 204. The display data selector 350 generally functions as a multiplexer to determine which data is displayed on each of the lines 202 and 204 of the LCD display 200. The display data selector 350 may select data from the switch interface 300 for display on both lines 202 and 204, or the display data selector 350 may select data from the user interface 340 for display on both lines 202 and 204, or the display data selector 350 may select some data from the switch interface 300 and some data from the user interface 340 for display on the lines 202 and 204. In the preferred embodiment, the display data selector 350 determines which data is to be selected for display based on the operational state of the telephone 200.

Figure 5:
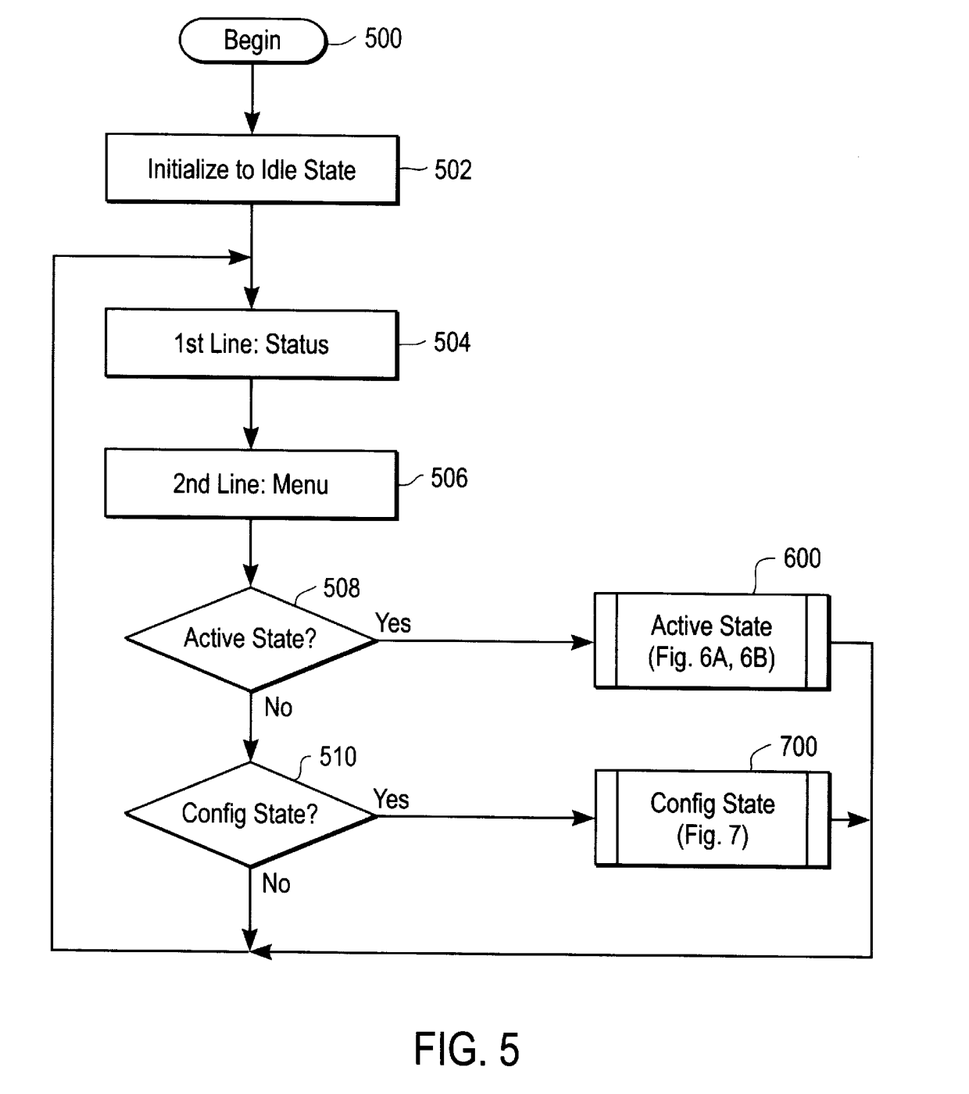
FIG. 5 is a flow chart of an overall method performed by the preferred embodiment interface unit of the present invention.
Figure 6A:
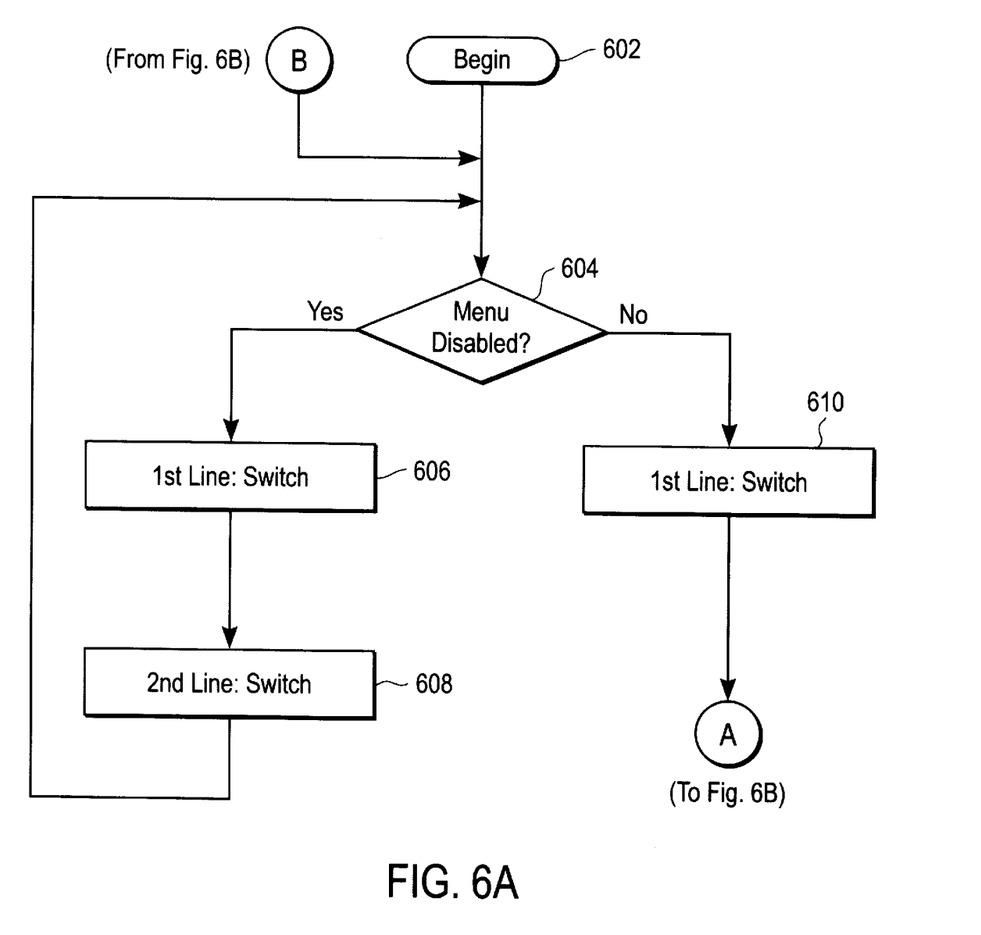
FIGS. 6A and 6B are flow charts of a method performed by the preferred embodiment interface unit of the present invention while the telephone is in an active state.
Figure 6B:
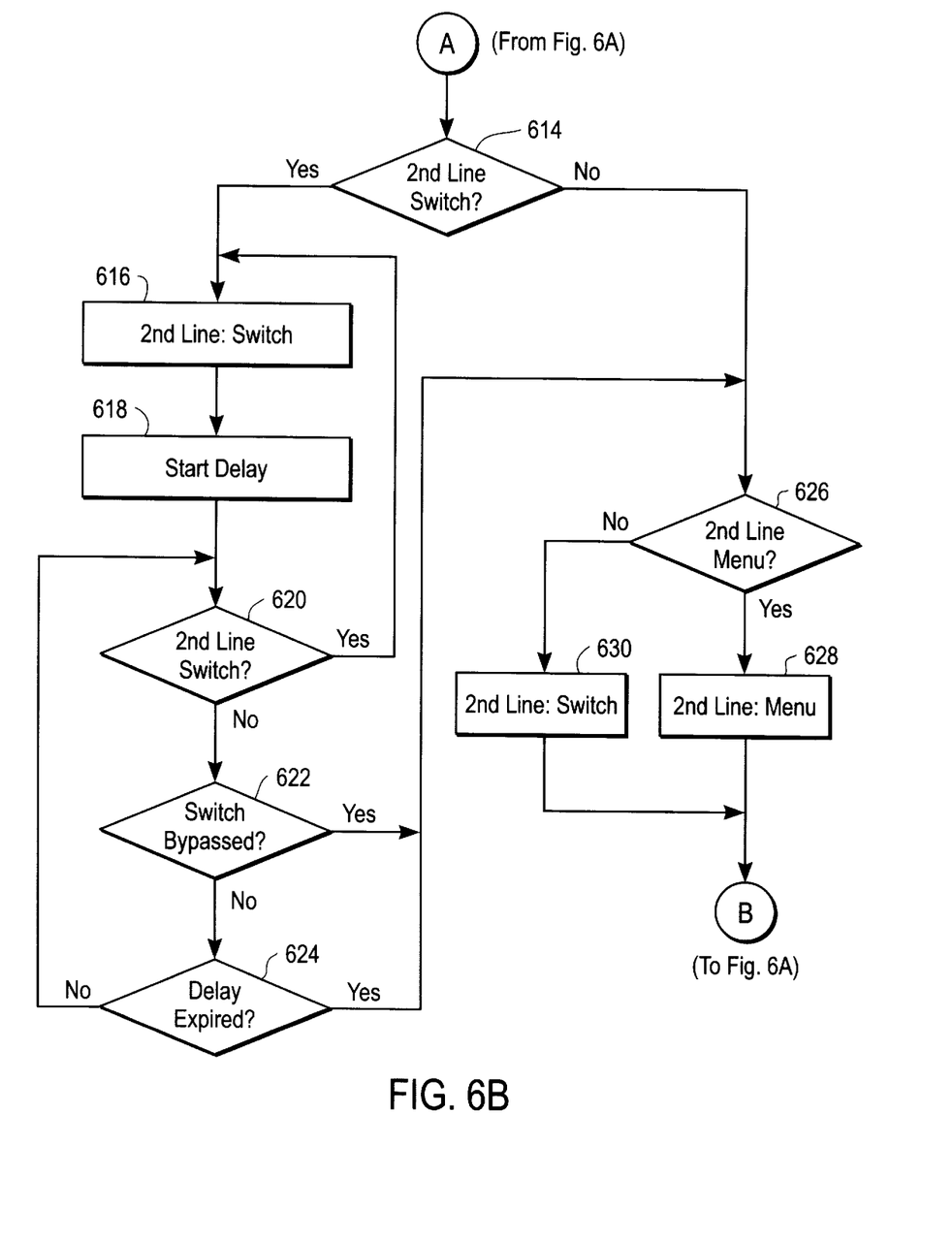
Figure 7:
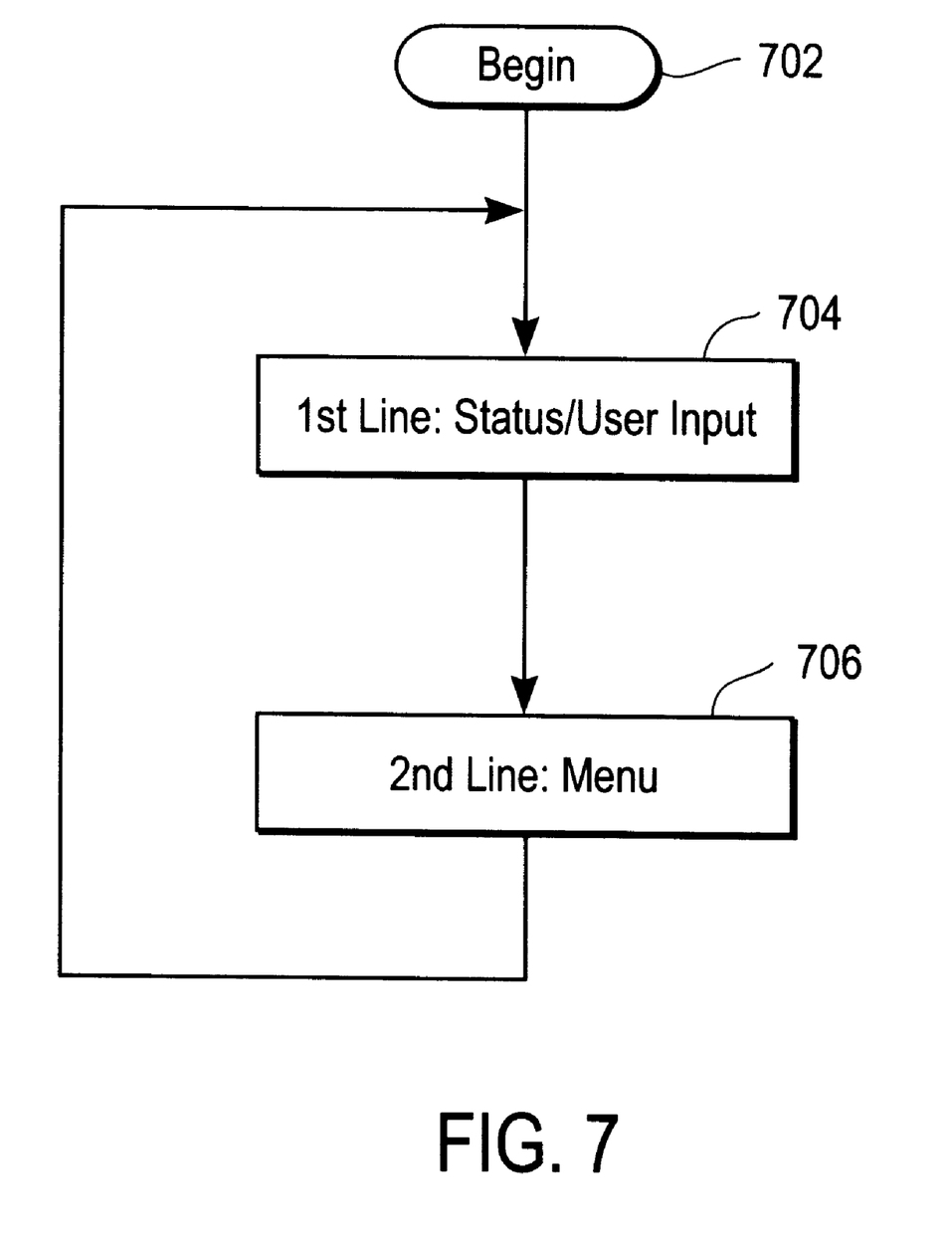
FIG. 7 is a flow chart of a method performed by the preferred embodiment interface unit of the present invention while the telephone is in a configuration state.

FIG. 5 illustrates an overall method performed by the display data selector 350 in selecting data to be written to each line 202 and 204 of the display 200. In particular, the flow chart of FIG. 5 illustrates the method performed by the display data selector 350 when the telephone 100 is in the idle state. FIGS. 6A and 6B illustrate the method performed by the display data selector 350 when the telephone 100 is in the active state, and FIG. 7 illustrates the method performed by the display data selector 350 when the telephone 100 is in the configuration state. The method of FIG. 5 begins at a terminal block 500.

At a process block 502, the entire telephone 200 is initialized to the idle state. This step may occur, for example, when power is applied to the telephone 200 or when the telephone 200 is reset.

At a process block 504, the display data selector 350 selects status data received from either the switch interface 300 or the user interface 340 for display on the first line 202. The status data that is displayed depends on the status of the telephone 200. Possible status messages are given priority rankings, and the highest ranking status condition that currently applies is displayed. In the preferred embodiment, the possible status messages for the idle state include the following (listed in order of descending priority):

(a) Null call reference from the switch 90. This display is erased after five seconds.
(b) Download required prompt, which indicates that the switch 90 has informed the telephone 100 that a parameter download is required.
(c) An indication that the telephone 100 is not configured yet.
(d) Battery operation indication.
(e) Indication of new calls in the call log.
(f) Time and date.

As new status information is received from either the switch interface 300 or the user interface 340, the display data selector 350 updates the status information displayed on the first line 202 according to the above specified priorities. Thus, if there is no null call reference from the switch 90, a download is not required and the telephone 100 has been configured, but the telephone 100 is operating from battery power, the display data selector 350 indicates the battery operation condition on the first line 202. If, however, the switch interface 300 sends a null call reference to the display data selector 350, the display data selector 350 updates the line 202 to reflect the null call reference condition. After a five second delay has elapsed, the display data selector 350 again updates the line 202 to indicate that the telephone 100 is operating from battery power.

At a process block 506, the display data selector 350 selects menu messages from the user interface 340 for display on the second line 204. Again, the display data selector 350 updates the second line 204 as subsequent menu messages are received from the user interface 340. Thus, if a user of the telephone 200 presses the right scroll key 236 to view a subsequent option, the user interface 340 sends a menu message to the display data selector 350 indicating the new prompt for the user, and the display data selector 350 responds by displaying a prompt related to the subsequent option. When multiple menu items are available to the user, so that the user can scroll through the various menu items, the user interface 340 also sends data to the display data selector 350 to cause the display data selector 350 to display the dialog key symbols 206 on the second line 204, as illustrated in FIG. 4B. Thus, when the user sees the dialog key symbols 206, the user knows that the user can use the left scroll key 234 and the right scroll key 236 to scroll through a multiple item menu.

In summary, when the telephone 100 is in the idle state, the display data selector 350 selects status data from either the switch interface 300 or the user interface 340 for display on the first line 202, and the display data selector 350 selects menu data from the user interface 340 for display on the second line 204.

At a decision block 508, the display data selector 350 determines whether the telephone 100 is entering the active state. As described above, the call control unit 320 determines the operational state and mode of the telephone 100. If the telephone 100 is entering the active state, the method of FIG. 5 proceeds to a process block 600. Otherwise, the method of FIG. 5 proceeds to a decision block 510. A method performed by the display data selector 350 during the process block 600 is described in greater detail below with reference to FIGS. 6A and 6B.

At the decision block 510, the display data selector 350 determines whether the telephone 100 is entering the configuration state. If the telephone 100 is entering the configuration state, the method of FIG. 5 proceeds to a process block 700. Otherwise, the method of FIG. 5 returns to the process block 504. A method performed by the display data selector 350 during the process block 700 is described in greater detail below with reference to FIG. 7.

FIGS. 6A and 6B form a flow chart illustrating a method performed by the display data selector 350 when the telephone 100 is in the active state. The method begins at a terminal block 602.

At a decision block 604, the display data selector 350 determines from the user interface 340 whether the menu driven interface has been disabled. A user of the telephone 100 can disable the menu driven interface in either of two ways. First, the user can disable the menus by following menu prompts while the telephone 100 is in the configuration state. When the menus are disabled in this manner, the menu messages will not be displayed while the telephone 100 is in the active state, until the menus are again enabled through the configuration menus. The menus can also be temporarily disabled by pressing the stop key 238. When the menus have been temporarily disabled, the user can enable the menus again by pressing either of the scroll keys 234 or 236. If the menus are disabled, the method of FIGS. 6A and 6B proceeds to a process block 606. Otherwise, the method proceeds to a process block 610.

At the process block 606, the display data selector 350 displays data received from the switch interface 300 on the first line 202. As the display data selector 350 receives additional data from the switch interface 300, the display data selector 350 updates the first line 202 to indicate the new data.

At a process block 608, the display data selector 350 displays data received from the switch interface 300 on the second line 204. Again, as the display data selector 350 receives additional data from the switch interface 300, the display data selector 350 updates the second line 204 to indicate the new data. After the process block 608, the method of FIGS. 6A and 6B returns to the decision block 604.

At the process block 610, the display data selector 350 displays data received from the switch interface 300 on the first line 202. Again, as the display data selector 350 receives additional data from the switch interface 300, the display data selector 350 updates the first line 202 to indicate the new data.

At a decision block 614, the display data selector 350 determines whether display data for the second line 204 has been received from the switch interface 300. If so, the method of FIGS. 6A and 6B proceeds to a process block 616. If not, the method proceeds to a decision block 626.

At the process block 616, the display data selector 350 displays the data received from the switch interface 300 on the second line 204.

At a process block 618, the display data selector 350 starts a delay timer.

At a decision block 620, the display data selector 350 determines whether additional display data for the second line 204 has been received from the switch interface 300. If so, the method of FIGS. 6A and 6B returns to the process block 616. If not, the method proceeds to a decision block 622.

At the decision block 622, the display data selector 350 determines from the user interface 340 whether the user has elected to bypass the data received from the switch interface 300, so as to continue viewing the menu messages. The user can elect to bypass the data received from the switch interface 300 by pressing either of the scroll keys 234 or 236. If the user has elected to bypass the data received from the switch interface 300, the method of FIGS. 6A and 6B proceeds to the decision block 626. Otherwise, the method proceeds to a decision block 624.

At the decision block 624, the display data selector 350 determines whether the delay timer has expired. In the preferred embodiment, the delay timer is set to time a two second period, but this time value can be changed through the configuration state. If the delay timer has expired, the method of FIGS. 6A and 6B proceeds to the decision block 626. Otherwise, the method returns to the decision block 620.

At the decision block 626, the display data selector 350 determines whether menu data for the second line 204 has been received from the user interface 340. If so, the method of FIGS. 6A and 6B proceeds to a process block 628. If not, the method proceeds to a process block 630.

At the process block 628, the display data selector 350 displays menu data received from the user interface 340 on the second line 204. Again, as the display data selector 350 receives additional menu data from the user interface 340, the display data selector 350 updates the second line 204 to indicate the new data. After the process block 628, the method of FIGS. 6A and 6B returns to the decision block 604.

At the process block 630, the display data selector 350 displays data received from the switch interface 300 on the second line 204. Again, as the display data selector 350 receives additional display data from the switch interface 300, the display data selector 350 updates the second line 204 to indicate the new data. After the process block 630, the method of FIGS. 6A and 6B returns to the decision block 604.

In summary, when the telephone 100 is in the active state, the display data selector 350 displays data received from the switch interface 300 on the first line 202. If the menu driven interface is disabled, the display data selector 350 also displays data received from the switch interface 300 on the second line 204. If the menus are not disabled, the display data selector 350 generally displays menu data received from the user interface 340 on the second line 204. However, when the display data selector 350 receives display data from the switch interface 300 for the second line 204, the display data selector 350 generally displays the received data for a period of time before returning to a display of the menu data.

There may also be situations in which the display data selector 350 writes some data from the switch interface 300 and some data from the user interface 340 to the same line 202 or 204 of the display 200 at the same time. For example, when a user at the telephone 100 places an outgoing call, the switch 90 may send a prompt message for display on the first line 202, accompanied by a request for the telephone number to be dialed. As the user dials the telephone number, the dialed digits are relayed to the switch 90. However, the switch 90 may not echo the dialed digits back to the display data selector 350 for display on the display 200. Instead, the user interface 340 may send information related to the dialed digits to the display data selector 350. In this case, the display data selector 350 displays the prompt from the switch 90, along with the dialed digits from the user interface 340, both on the first line 202.

FIG. 7 is a flow chart illustrating a method performed by the display data selector 350 when the telephone 100 is in the configuration state. The same method could be performed when the telephone is in other states or modes of operation, such as a call log access state or a composed dialing mode. The method of FIG. 7 begins at a process block 702.

At a process block 704, the display data selector 350 selects status information or user input data from the user interface 340 for display on the first line 202. The status information received from the user interface 340 generally relates to the status of the configuration process or the current configuration settings of the telephone 100.

At a process block 706, the display data selector 350 selects menu data from the user interface 340 for display on the second line 204. After the process block 706, the method of FIG. 7 returns to the process block 704.

In summary, when the telephone 100 is in the configuration state, the display data selector 350 displays status information and user input data received from the user interface 340 on the first line 202, and the display data selector 350 displays menu data received from the user interface 340 on the second line 204.

A person of skill in the art will understand that the present invention can be implemented in various ways that are significantly different from the preferred embodiment. For example, the display data selector 350 can receive display data from two sources that are external to the telephone 100, as opposed to receiving data from one external source (the switch 90) and one internal source (the user interface 340).

Also, the data received from each of the sources may differ from the data involved in the preferred embodiment. For example, the telephone 100 may generate display data that is different from the menu data described above. Also, the methods for determining which data is displayed on the LCD display 200 can vary from the methods described above.

What is claimed is:

1. An interface unit for a telephone display, said interface unit receiving digital data for display about call status from an ISDN system, said ISDN system including a communication channel and a control channel, said interface unit comprising:

a user interface, said user interface generating menu data for implementing a menu driven interface and allowing a user to navigate through menu selections, said interface also capturing user inputs in response to menus; and a display data selector, said display data selector receiving said data for display about call status from said control channel and said user inputs from said user interface, said display data selector selecting data items from said data for display about call status and said menu data for display on said telephone display.

2. An interface unit as in claim 1, wherein said data for display about call status from said ISDN system and said menu data from said user interface are simultaneously displayed on said telephone display.

3. An interface unit as in claim 1, wherein said telephone is an ISDN telephone.

4. An interface unit as in claim 1 wherein the interface unit is integral to the telephone.

5. An interface unit as in claim 1 wherein the communication channel is a voice channel.

6. An interface unit as in claim 1 wherein the communication channel is a data channel.

7. An interface unit as in claim 1 wherein there is more than one communication channel.

8. An interface unit as in claim 1 wherein there is more than one control channel.

9. An interface unit as in claim 1 wherein the communication channel is a voice channel.

10. An interface unit as in claim 1 wherein the communication channel is a data channel.

11. An interface unit as in claim 1 wherein there is more than one communication channel.

12. An interface unit as in claim 1 wherein there is more than one control channel.

13. An interface unit for a telephone display, said interface unit receiving digital data for display from system, said ISDN system including a communication channel and a control channel, said interface unit comprising:

a user interface, said user interface generating menu data for implementing a menu driven interface and allowing a user to navigate through menu selections, said interface also capturing user inputs in response to menus; and a display data selector, said display data selector receiving said data for display from said control channel and said user inputs from said user interface, said display data selector selecting data items from said data for display and said menu data for display on said telephone display.

14. An interface unit for telephone display as in claim 13, in which said display data concerns the telephone configuration, and the user inputs change the configuration.

* * * * *